(12) United States Patent
Soldatelli

(10) Patent No.: US 8,348,329 B2
(45) Date of Patent: Jan. 8, 2013

(54) COVER FOR PICKUP TRUCKS

(76) Inventor: Rubens Fernando Soldatelli, Caxias do Sul (BR)

(*) Notice: Subject to any disclaimer, the term of this patent is extended or adjusted under 35 U.S.C. 154(b) by 0 days.

(21) Appl. No.: 12/824,584

(22) Filed: Jun. 28, 2010

(65) Prior Publication Data

US 2010/0327618 A1 Dec. 30, 2010

(30) Foreign Application Priority Data

Jun. 26, 2009 (BR) .................................. 0902231

(51) Int. Cl.
*B60P 7/02* (2006.01)

(52) U.S. Cl. ............ 296/100.1; 296/100.01; 296/100.06

(58) Field of Classification Search ............. 296/100.01, 296/100.02, 100.06, 100.1
See application file for complete search history.

(56) References Cited

U.S. PATENT DOCUMENTS

| | | | | |
|---|---|---|---|---|
| 3,167,349 A | * | 1/1965 | Young et al. ............... | 296/100.1 |
| 3,536,352 A | * | 10/1970 | Beckley ........................ | 296/167 |
| 3,857,601 A | * | 12/1974 | Robbins .......................... | 296/10 |
| 3,995,890 A | * | 12/1976 | Fletcher ........................ | 296/10 |
| 4,452,482 A | * | 6/1984 | Grise ............................. | 296/10 |
| 4,848,830 A | * | 7/1989 | Parson ........................ | 296/165 |
| 5,016,935 A | * | 5/1991 | Semple ....................... | 296/26.04 |
| 5,403,061 A | * | 4/1995 | Micknowicz ............. | 296/100.06 |
| 5,433,500 A | * | 7/1995 | Brorson et al. ............... | 296/164 |
| 6,151,908 A | * | 11/2000 | Graaff ............................. | 62/371 |
| 6,543,834 B2 | * | 4/2003 | Sisson ....................... | 296/100.1 |
| 6,655,725 B2 | * | 12/2003 | Soldatelli ................. | 296/100.01 |
| 6,712,241 B1 | * | 3/2004 | Garcia et al. .................. | 222/107 |
| 6,863,337 B2 | * | 3/2005 | Block ........................ | 296/186.4 |
| 7,275,779 B2 | * | 10/2007 | Hebron ...................... | 296/100.1 |
| 7,735,898 B1 | * | 6/2010 | Bridges .................... | 296/100.06 |
| 7,806,457 B2 | * | 10/2010 | Bankert ..................... | 296/100.05 |
| 2003/0094832 A1 | * | 5/2003 | Soldatelli ................ | 296/100.01 |
| 2004/0007900 A1 | * | 1/2004 | Block ...................... | 296/100.02 |
| 2009/0256381 A1 | * | 10/2009 | Bankert ..................... | 296/100.1 |

* cited by examiner

*Primary Examiner* — Lori Lyjak
(74) *Attorney, Agent, or Firm* — Allen, Dyer, Doppelt, Milbrath & Gilchrist, P.A.

(57) ABSTRACT

A cover for pickup trucks includes a cover with a structure formed by laterals, a front part, a rear part from tubes and/or profiles that form its shape and design. Finish pieces from plastic, metal and/or the like that change the shape and the design can be arranged on the tubes, profiles, and/or the like. The cover is complemented by glass, windows, doors and/or the like, has headlamps, either retractable or non-retractable, and/or the like, and racks and/or like retractables, an air deflector, and a rear wiper.

18 Claims, 2 Drawing Sheets

COVER FOR PICKUP TRUCKS

CROSS-REFERENCE TO RELATED APPLICATION

This application claims the benefit of Brazilian Patent Application Serial No. P10902231-7, filed on Jun. 26, 2009, the contents of which are hereby incorporated by reference in their entirety.

FIELD OF THE INVENTION

The present invention relates to pickup truck covers, and used preferably for covering pickup truck beds and the like.

BACKGROUND OF THE INVENTION

Covers for pickup trucks, sometimes also known as caps, are popular pickup truck accessories. However, improvements to such covers are still possible.

SUMMARY OF THE INVENTION

In view of the foregoing, it is an object of the present invention to provide an improved cover for pickup trucks. The cover for pickup trucks may be used in any other place or system as well as comprise the most varied kinds of materials in conjunction or separately such as metal, wood, plastic, rigid and/or flexible materials and/or the like without deviating from the invention since the characteristics originally claimed herein are not lost.

This model may contain other devices added thereto without deviating from the nature of the invention since the characteristics originally claimed herein are not lost.

There are no similar devices of this nature in the state of the art.

The cover for pickup trucks, subject matter of this patent, will be described in a clear, concise, and objective manner so that it can be clearly understood and put into practice by any specialist in this technological sector. Based on a set of illustrative drawings, the proposed model is presented by way of example and without an intention to limit the scope of the protection by the patent and only for more detailed analysis of the characteristics to be claimed.

This model, however, must not be limited to the presented form and other configurational conceptions may be considered since they contain the same distinctive functional characteristics of the basic model.

DETAILED DESCRIPTION OF PREFERRED EMBODIMENTS

Figure 1:
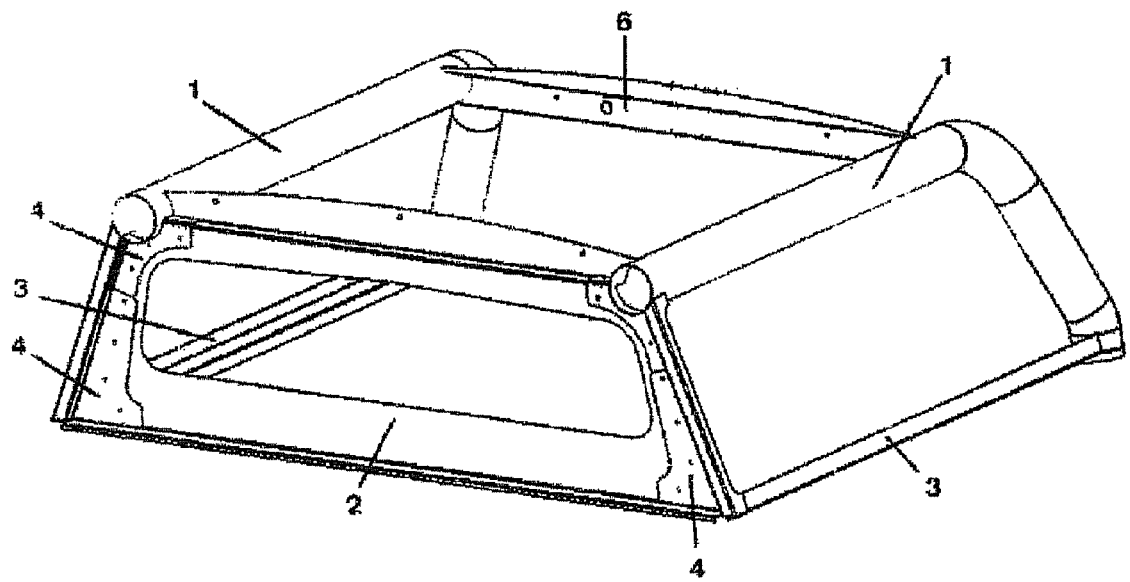
FIG. 1 is a perspective view of a cover for pickup trucks, according to an embodiment of the present invention, including tubes, a frontal piece, bases, supports, and a rear upper part.
Figure 2:
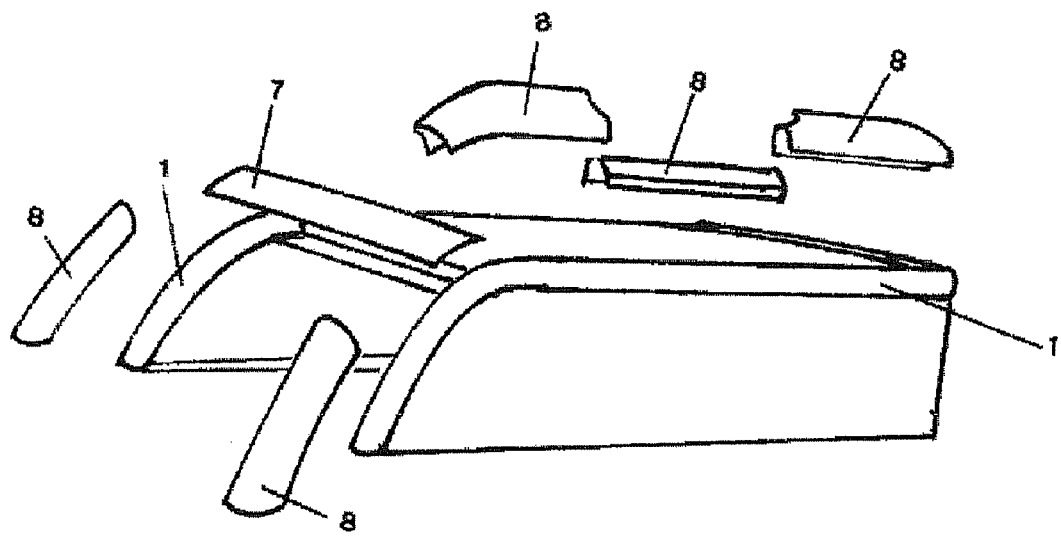
FIG. 2 is a partially exploded perspective view of the cover of FIG. 1, also including finish pieces and a deflector.
Figure 3:
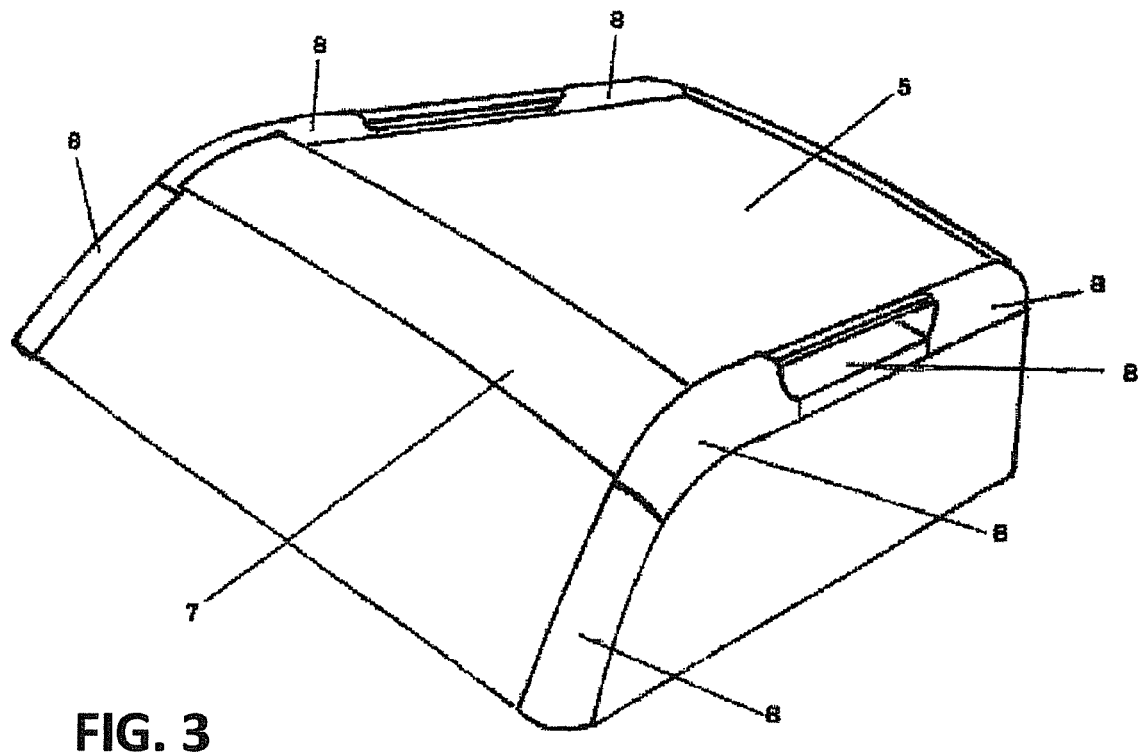
FIG. 3 is a perspective view of the cover of FIG. 1, with the finish pieces arranged on the tubes, and also including the deflector and a roof.

Referring to FIGS. 1-3, the cover for pickup trucks, subject matter hereof, is developed and projected from a cover with a structure formed by tube sides 1, profiles and/or the like, which, in addition to forming the side of the cover, form its shape and design, the right and left base 3 is formed by tubes, profiles, folded plates and/or the like, and has in the front portion a stamped, folded piece 2 and/or the like, which contains the whole front portion with joints and supports 4 for joining, including a cutout for arranging glass and/or a window in the shape of the glass of the cab; the rear upper part consists of a piece 6 that makes up a structure, can be fixed by means of the tubes 1, profiles and/or the like, acts as a conduit, and holds hinges of the back door, a rear wiper, a water jet, a lamp and the like; the finishes can be tubes, profiles, a stamped piece and/or the like.

The roof 5 is made from a flat, stamped plate and/or the like, has in the rear portion tubes, profiles and/or a stamped, folded piece or the like that acts as an air deflector 7 cleaning the rear door; the cover is complemented by glass, windows, doors and/or the like, has headlamps, either retractable or non-retractable, and/or the like, racks, and/or like retractables. The finish pieces 8 from plastic, metal and/or the like that change the shape and design may be arranged on the tubes 1, profiles and/or like laterals. The glass and/or side windows may open in an automatic or manual pantographic manner and with a remote control.

Figure 4:
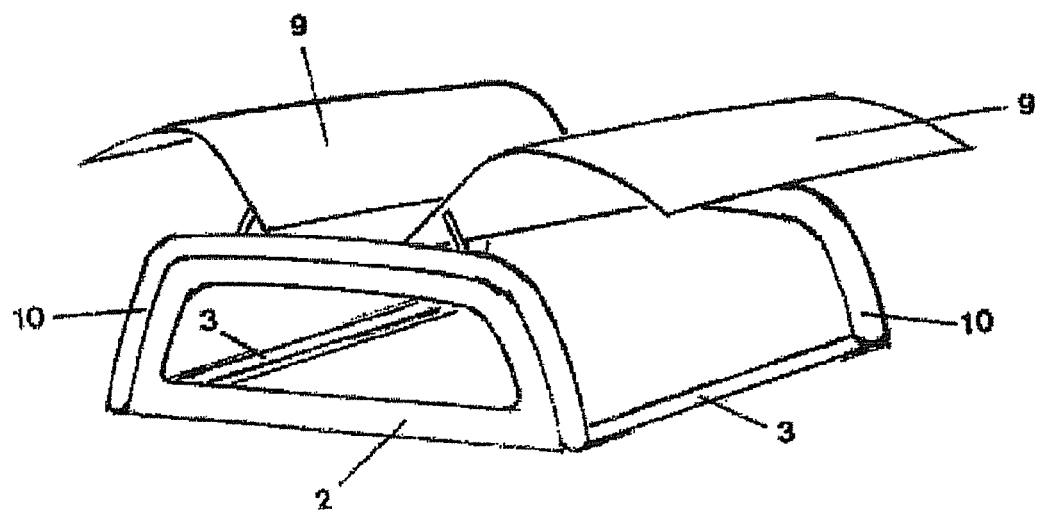
FIG. 4 is a view of a cover for pickup trucks, according to another embodiment of the present invention, including tubes, a frontal piece, bases and side windows.

Referring to FIG. 4, according to another embodiment of the present invention, the front and rear parts may consist of tubes 10, profiles and/or the like, which, in addition to forming a structure, make up the shape and the design of the cover. In this embodiment, there may be glass and/or a side window 9 that open in seagull-wing-like manner, that is, the glass and/or the window opens together with a part of the roof, thus achieving a wider opening and making the side access easier. The finishes of different shapes may be arranged on the tubes, profiles and/or the like, thus changing the shape and the design of the cover, attached by means of glue, double-sided tape, rivets, screws and/or the like. The glass and the roof are fixed to the tubes, profiles and/or the like through rubber, plastic profiles and/or the like with adhesives, double-sided tape, glue and/or the like with no need for supports. The parts are joined by supports, like the supports 4 (see FIG. 1), with screws, rivets, adhesives and/or the like. The cover may be transported partially or totally disassembled and assembled when delivered to the customer, thus making the transportation easier.

In general, the foregoing description is provided for exemplary and illustrative purposes; the present invention is not necessarily limited thereto. For instance, the present invention may comprise other devices added thereto without deviating from the invention since the characteristics initially claimed herein are not lost. Also, certain aspects of the model presented herein may be altered such as: materials, shape, etc. without altering what has been originally claimed herein. Rather, those skilled in the art will appreciate that these and additional modifications, as well as adaptations for particular circumstances, will fall within the scope of the invention as herein shown and described and the claims appended hereto.

What is claimed is:

1. A cover for pickup trucks comprising:
   a front portion dimensioned to extend vertically behind a cab of the pickup truck and defining an opening for accommodating a window thereinto, the front portion including a flat piece having a lower edge and an upper edge; and
   right and left side tubes formed by respective tubes and extending horizontally rearwardly from opposite ends of the upper edge of the flat piece and bending downwardly to terminate rearwardly of and on a level with the lower edge of the flat piece at a level with the lower edge of the front portion such that a top of the cover is bounded along three edges by the flat piece and the right and left side tubes, right and left sides of the cover are bounded along three edges by the flat piece and the right and left side tubes, respectively, and a rear of the cover is bounded along two edges by the right and left side tubes; and a roof extending across the top of the cover between the front portion and the left and right side tubes.

2. The cover of claim 1, further comprising right and left bases extending between opposite ends of the lower edge of the front portion and rearward ends of the right and left side tubes such that the right and left sides of the cover are bounded along fourth sides thereof by the right and left bases, respectively.

3. The cover of claim 1, further comprising a rear upper part extending between the right and left side tubes adjacent where the right and left side tubes bend downwardly.

4. The cover of claim 3, further comprising a rear door hingedly supported by the rear upper part.

5. The cover of claim 4, wherein the roof includes an air deflector above the rear upper part for cleaning the rear door.

6. The cover of claim 1, further comprising finish pieces arranged on the right and left side tubes changing appearances thereof.

7. The cover of claim 1, further comprising right and left side windows arranged on the right and left sides of the cover.

8. The cover of claim 1, wherein the right and left side windows open in a pantographic manner.

9. The cover of claim 8, wherein the right and left side windows are configured to be opened remotely.

10. The cover of claim 1, wherein the flat piece is stamped and folded.

11. The cover of claim 10, wherein the front portion further includes supports and joints connected to the stamped, folded flat piece.

12. The cover of claim 10, wherein a lower edge of the flat piece is adapted for connection to a front edge of a bed of a pickup truck.

13. A cover for pickup trucks comprising:
a single piece front Dart forming a forward edge of a top of the cover and bending down on right and left ends thereof to also form forward edges of right and left sides of the cover, three edges of a front side of the cover being bounded by the front part;
a single piece rear part forming a rear edge of the top of the cover and bending down on right and left ends thereof to also form rear edges of the right and left sides of the cover, three edges of a rear side of the cover being bounded by the rear part; and
right and left bases extending between respective right and lefts ends of the front and rear parts:
wherein the front and rear parts are tubes.

14. A cover for pickup trucks comprising:
a single piece front part forming a forward edge of a top of the cover and bending down on right and left ends thereof to also form forward edges of right and left sides of the cover, three edges of a front side of the cover being bounded by the front part
a single piece rear part forming a rear edge of the top of the cover and bending down on right and left ends thereof to also form rear edges of the right and left sides of the cover, three edges of a rear side of the cover being bounded by the rear part;
right and left bases extending between respective right and lefts ends of the front and rear parts: and
a flat piece defining a window opening extending across the front side of the cover.

15. A cover for pickup trucks comprising:
a single piece front part forming a forward edge of a top of the cover and bending down on right and left ends thereof to also form forward edges of right and left sides of the cover, three edges of a front side of the cover being bounded by the front part:
a single piece rear part forming a rear edge of the top of the cover and bending down on right and left ends thereof to also form rear edges of the right and left sides of the cover, three edges of a rear side of the cover being bounded by the rear part:
right and left bases extending between respective right and lefts ends of the front and rear parts: and
a first side window covering one of the left and right side of the cover and also forming a portion of a roof covering the top of the cover.

16. The cover of claim 15, wherein the first side window is hinged to open in a gull-wing manner.

17. The cover of claim 15, further comprising a second side window covering the other of the left and right side of the cover and also forming another portion of the roof covering the top of the cover.

18. The cover of claim 16, wherein the first and second side windows are both hinged to open in a gull-wing manner.

* * * * *